Sept. 8, 1959 W. WALTHER 2,903,275
ADJUSTABLE FIFTH-WHEEL MOUNTING
Filed Dec. 19, 1957 2 Sheets-Sheet 1
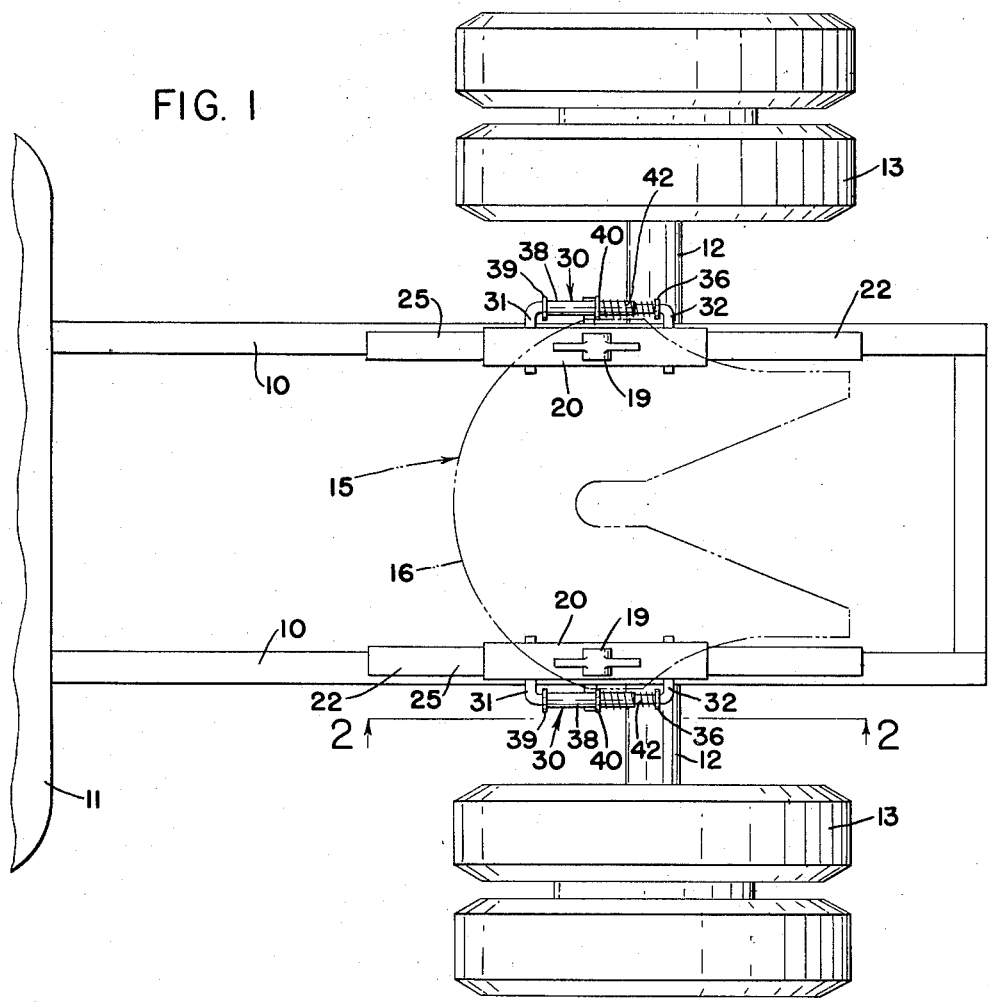
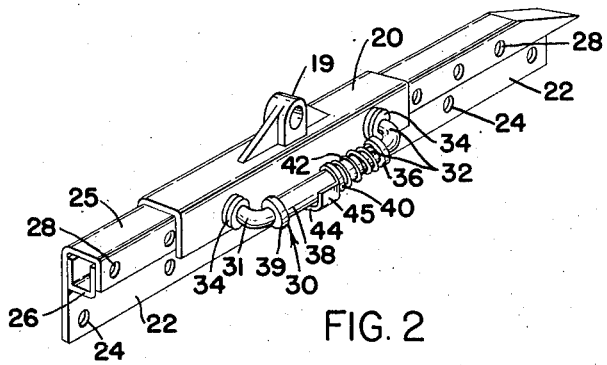
INVENTOR.
WILLIAM WALTHER
BY Ely, Fryed Hamilton
ATTORNEYS

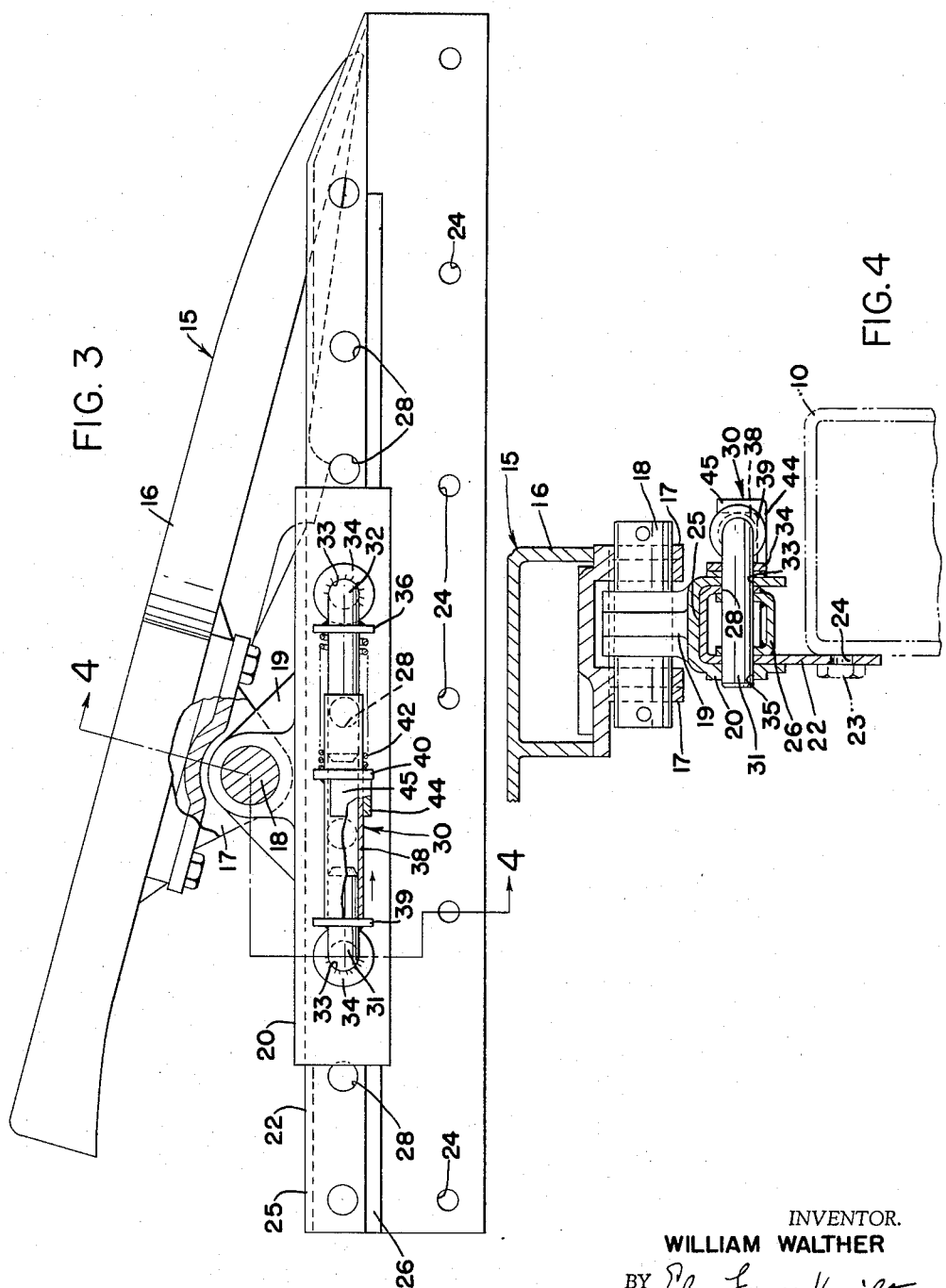

United States Patent Office 2,903,275
Patented Sept. 8, 1959

2,903,275

ADJUSTABLE FIFTH-WHEEL MOUNTING

William Walther, Dayton, Ohio, assignor to The Dayton Steel Foundry Company, Dayton, Ohio, a corporation of Ohio Application December 19, 1957, Serial No. 703,798

8 Claims. (Cl. 280—407)

The present invention relates to improvements in adjustable fifth-wheel mountings for connection of a semi-trailer to a truck or tractor.

In the past, many forms of adjustable fifth wheel mountings have been developed. Their purpose has been to provide for shifting and adjustment of the load carried between the wheels of the trailer and the wheels of the truck. Actually, this is a relatively simple operation in theory and requires merely that the point of contact between trailer and truck be adjustable in relation to the rear wheels of the truck. When such adjustment is provided, the load of the trailer in relation to the truck may be shifted as desired. However, many of the prior art structures have been unduly complicated, employing actuating cylinders, complex linkages, auxiliary wheels, elaborate suspension springing, etc.

It has been found, however, that most trucking operations do not require adjustable fifth-wheel mountings of such complexity. What is required is a fifth-wheel mounting which can be easily installed on the bed of a conventional truck, which can be adjusted before connection of the semi-trailer, and which is provided with a safe and effective locking means to prevent nonintentional shifting of the mounting. A mounting possessing these features and which can be produced at relatively low cost is of great value to the trucking industry.

Accordingly, it is an object of the present invention to provide a fifth-wheel mounting which can be installed on a conventional truck, which can be adjusted before connection of the semi-trailer, and which cannot be unintentionally shifted.

Other objects and additional advantages of the invention will be apparent in view of the following detailed description of the invention and the attached drawings.

In the drawings:

Fig. 1 is a plan view of a truck having a fifth-wheel mounting installation according to the invention;

Fig. 2 is a perspective view of a "left-hand" unit of a fifth-wheel mounting, taken substantially as indicated on lines 2—2 of Fig. 1;

Fig. 3 is an elevation of a fifth-wheel mounting according to the invention; and Fig. 4 is a section taken substantially as indicated on line 4—4 of Fig. 3.

Referring to Fig. 1, there is shown a truck or tractor having horizontal frame members 10 extending rearwardly from the truck body 11 and supported by the rear axle 12 and wheels 13. The fifth-wheel mounting, indicated generally by the numeral 15, is carried by the frame member 10 and is longitudinally movable thereon above the axle 12.

The fifth-wheel mounting 15 includes a rearwardly slotted top plate 16, of conventional shape and construction, having a pair of downwardly depending flanges 17. Each flange 17 is supported by and rotatable upon a short shaft 18 extending transversely of each frame member 10. Each shaft 18 is supported by a trunnion block 19 carried by a movable support member 20.

Each support member 20 is C-shaped in cross-section and is of sturdy construction, preferably being of cast steel. The inner surfaces of member 20 are accurately machined to provide a precision yet slidable fit over a support flange 22. Each support flange 22 is mounted on the side of a frame member 10 by means of bolts 23 inserted through holes 24.

As best shown in Fig. 4, the support flange 22 is L-shaped in cross-section. The upper portion of flange 22 provides a rail surface 25 which slidably supports a support member 20. To further strengthen the flange 22, another C-shaped channel member 26 is welded in an inverted position within the upper portion of flange 22. Opening transversely through the box-section defined by the upper portion of flange 22 and the member 26 are a series of regularly spaced aligned holes 28 for insertion of leg pins of an improved locking means indicated generally by the numeral 30.

The locking means 30 includes cooperative front and rear leg pins, 31 and 32 respectively, which secure the support member 20 at any one of several predetermined positions on the support flange 22. The outer side of each support member 22 is provided with two widely spaced apart holes 33 having protective and leg pin aligning bushings 34. The inner side of each support member is provided with two holes 35 aligned with the respective holes 33.

The front leg pin 31 is a resilient steel rod bent at right angles and having a diameter so as to fit snuggly through holes 33 and 35 in the member 20 and the aligned holes 28 in the flange 22. The rear leg pin 32 is also a resilient steel rod bent at right angles and having a diameter so as to fit snuggly through the holes 28, 33 and 35. The forward end of the rear leg pin 32 has a collar 36 welded thereon.

The locking means 30 also includes a tubular sleeve 38 having an internal diameter so as to slidably fit over the leg pins 31 and 32. The forward end of the sleeve 38 is preferably provided with a welded collar 39. At approximately its middle point, the sleeve 38 is provided with another welded collar 40. The locking means 30 is completed by a coiled compression spring 42 which fits around the sleeve 38 and the forward end of the rear leg pin 32 and is seated between the collars 36 and 39 to provide a condition of resilient tension on the leg pins 31 and 32 when inserted in holes 28, 33 and 35.

As best shown in Fig. 3, the locking means 30 may be assembled by first inserting the rear leg pin 32 through the holes in member 20 and flange 22. The spring 42 is then placed over the forward end of leg pin 32 in contact with collar 36. The sleeve 38 is then placed on the forward end of leg pin 32. It will be noted that these operations may be performed with the forward end of leg pin 32 pointed in any convenient direction. The front leg pin is then inserted through the holes in member 20 and flange 22. Then, with his right hand, the operator grasps the sleeve 38 between the collars 39 and 40 and compresses spring 42. With his left hand, the operator points the front leg pin 31 in a rearwardly direction. The sleeve 38 and leg pin 31 are aligned, the sleeve 38 is released, and the assembly of the locking means is complete.

In order to provide a maximum of resilient tension on the pins 31 and 32 to prevent nonintentional shifting of the mounting 15, the outer side of the support member is provided with a strap 44 having an upwardly directed flange 45 engaging the forward face of collar 40. Thus, after the sleeve 38 and leg pin 31 are aligned and released, the spring 42 will urge the collar 40 against the strap 44.

To adjust the mounting, the trailer is disconnected, the operator quickly disassembles the locking means 30 in reverse of the assembly operation described above, and shifts the support members 20 either forwardly or rearwardly on the flanges 22 as desired.

What is claimed is:

1. In an adjustable fifth-wheel mounting for a truck having two parallel rear frame members, the combination of an upwardly directed support flange adapted to be attached to each of said frame members, a support member slidable longitudinally on each flange, a resilient locking means having two leg pins extending transversely through said support member and support flange at predetermined positions thereon, a trunnion atop each support member, and a fifth-wheel plate connected to and supported between said trunnions above said frame members.

2. In an adjustable fifth-wheel mounting for a truck having two parallel rear frame members, the combination of: an upwardly directed support flange adapted to be attached to each of said frame members, each flange having a series of aligned openings transversely thereof; a support member slidable longitudinally on each flange, each member having two sets of aligned holes defining a pair of openings transversely thereof; a locking means for each support, each locking means including leg pins extending through said pair of openings in a support member and two selected openings in a support flange and having outer portions opposing each other longitudinally of a support member, and yielding means urging the opposed outer portions of the leg pins apart; a trunnion atop each support member; and a fifth-wheel plate connected to and supported between said trunnions above said frame members.

3. In an adjustable fifth-wheel mounting for a truck having two parallel rear frame members, the combination of: an upwardly directed support flange adapted to be attached to each of said frame members, each flange having a strengthened rail section with a series of aligned openings transversely thereof; a support member slidable longitudinally on each rail section, each member having two sets of aligned holes defining a pair of openings transversely thereof; a locking means for each support, each locking means including leg pins extending through said pair of openings in a support member and two selected openings in a support flange and having outer portions opposing each other longitudinally of said support member, and yielding means urging the opposed outer portions of the leg pins apart; a trunnion atop each support member; and a fifth-wheel plate connected to and supported between said trunnions above said frame members.

4. In an adjustable fifth-wheel mounting for a truck having two parallel rear frame members, the combination of: an upwardly directed support flange adapted to be attached to each of said frame members, each flange having a series of aligned openings transversely thereof; a support member slidable longitudinally on each flange, each member having two sets of aligned holes defining a pair of openings transversely thereof; a locking means for each support, each locking means including leg pins extending through said pair of openings in a support member and two selected openings in a support flange and having outer portions opposing each other longitudinally of said support member, and means connecting the opposed outer portions of the leg pins in a condition of resilient tension; a trunnion atop each support member; and a fifth-wheel plate connected to and supported between said trunnions above said frame members.

5. In an adjustable fifth-wheel mounting for a truck having two parallel rear frame members, the combination of: a support flange adapted to be attached to each of said frame members, each flange having a series of aligned openings transversely thereof; a support member slidable longitudinally on each flange, each member having two sets of aligned holes defining two openings transversely thereof and a strap extending laterally thereof between said openings; a locking means including two leg pins extending through the openings in said support member and two selected openings in said support flange, each leg pin having an outer portion opposed to the other longitudinally of said member, and connecting means urging the leg pins apart and maintained under tension by contact with said laterally extending strap; a trunnion atop each support member; and a fifth-wheel plate connected to and supported between said trunnions above said frame members.

6. In combination with a fifth wheel mounting having a pair of support members longitudinally slidable on parallel flanges, sets of aligned holes defining two openings transversely of each member, a series of aligned openings transversely of each flange, a pair of right-angled leg pins extending through the openings in each member and any two openings in each support, and yielding means urging the leg pins apart when their outer portions are opposed longitudinally of the member.

7. In combination with a fifth wheel mounting having a pair of support members longitudinally slidable on parallel flanges, sets of aligned holes defining two openings transversely of each member, a series of aligned openings transversely of each flange, a pair of right-angled leg pins extending through the openings in each member and any two openings in each support, and means connecting the leg pins longitudinally of each support in a condition of resilient tension.

8. In combination with a fifth wheel mounting having a pair of support members longitudinally slidable on parallel flanges, sets of aligned holes defining two openings transversely of each member, a series of aligned openings transversely of each flange, a pair of right-angled leg pins extending through the openings in each member and any two openings in each support, a tubular sleeve connecting the leg pins when their outer portions are opposed longitudinally of the member, and spring means yieldably urging said sleeve away from one of said leg pins.

References Cited in the file of this patent

UNITED STATES PATENTS

| 2,589,678 | DeLay | Mar. 18, 1952 |
| 2,713,500 | Flynn | July 19, 1955 |
| 2,819,096 | Sencenich | Jan. 7, 1958 |

FOREIGN PATENTS

| 313,012 | Great Britain | May 1, 1930 |